United States Patent
Shen et al.

(10) Patent No.: US 8,320,076 B1
(45) Date of Patent: Nov. 27, 2012

(54) METHOD AND SYSTEM FOR PROVIDING A MAGNETIC RECORDING TRANSDUCER INCLUDING AN ASSIST POLE HAVING SURFACES ANGLED WITH RESPECT TO THE ABS

(75) Inventors: Yong Shen, Saratoga, CA (US); Zhigang Bai, Milpitas, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 1189 days.

(21) Appl. No.: 12/147,364

(22) Filed: Jun. 26, 2008

(51) Int. Cl.
  *G11B 5/127* (2006.01)
  *G11B 5/147* (2006.01)

(52) U.S. Cl. ......... 360/125.04; 360/125.06; 360/125.07; 360/125.08; 360/125.43; 360/125.44

(58) Field of Classification Search ............. 360/125.04, 360/125.06, 125.07, 125.08, 125.12, 125.43, 360/125.44, 125.45, 125.5
See application file for complete search history.

(56) References Cited

U.S. PATENT DOCUMENTS

| | | |
|---|---|---|
| 5,949,625 A | 9/1999 | Sato et al. |
| 6,636,395 B1 | 10/2003 | Terunuma |
| 6,687,084 B2 | 2/2004 | Takahashi et al. |
| 6,710,972 B1 | 3/2004 | Mochizuki et al. |
| 6,710,973 B2 | 3/2004 | Okada et al. |
| 6,731,460 B2 | 5/2004 | Sasaki |
| 6,842,313 B1 | 1/2005 | Mallary |
| 6,903,900 B2 | 6/2005 | Sato et al. |
| 6,930,862 B2 | 8/2005 | Gill et al. |
| 7,009,812 B2 | 3/2006 | Hsu et al. |
| 7,075,756 B1 | 7/2006 | Mallary et al. |
| 7,100,266 B2 | 9/2006 | Plumer et al. |
| 7,133,252 B2 * | 11/2006 | Takano et al. ............ 360/125.13 |
| 7,159,302 B2 | 1/2007 | Feldbaum et al. |
| 7,181,828 B2 | 2/2007 | Yazawa et al. |
| 7,185,415 B2 | 3/2007 | Khera et al. |
| 7,248,437 B2 | 7/2007 | Yazawa et al. |
| 7,251,878 B2 | 8/2007 | Le et al. |
| 7,253,992 B2 | 8/2007 | Chen et al. |
| 7,322,095 B2 | 1/2008 | Guan et al. |
| 7,324,304 B1 | 1/2008 | Benakli et al. |
| 2002/0080525 A1 * | 6/2002 | Sato et al. ..................... 360/126 |
| 2004/0061988 A1 | 4/2004 | Matono et al. |
| 2005/0105213 A1 | 5/2005 | Takeo et al. |
| 2005/0135005 A1 * | 6/2005 | Im .................................. 360/125 |
| 2006/0002021 A1 * | 1/2006 | Li et al. ......................... 360/126 |
| 2006/0132972 A1 | 6/2006 | Tagami et al. |
| 2006/0139801 A1 * | 6/2006 | Kamada ....................... 360/125 |
| 2006/0158789 A1 | 7/2006 | Koyama et al. |
| 2006/0268456 A1 * | 11/2006 | Sasaki et al. ................. 360/126 |
| 2007/0070544 A1 * | 3/2007 | Yazawa ........................ 360/126 |
| 2007/0177300 A1 * | 8/2007 | Yin et al. ..................... 360/126 |
| 2007/0247747 A1 | 10/2007 | Benakli et al. |
| 2009/0122445 A1 * | 5/2009 | Jiang et al. ............... 360/123.12 |
| 2010/0277832 A1 * | 11/2010 | Bai et al. ................. 360/125.03 |

* cited by examiner

*Primary Examiner* — Jefferson Evans

(57) ABSTRACT

A method and system provide a magnetic transducer that includes an underlayer. The method and system include providing a recessed region in the underlayer. The recessed region includes a front having an angle from horizontal. The angle is greater than zero and less than ninety degrees. The method and system further includes providing an assist pole layer in the recessed region and providing a main pole layer. A portion of the main pole layer resides on the assist pole layer. A main pole is defined from the assist pole layer and the main pole layer.

6 Claims, 9 Drawing Sheets

METHOD AND SYSTEM FOR PROVIDING A MAGNETIC RECORDING TRANSDUCER INCLUDING AN ASSIST POLE HAVING SURFACES ANGLED WITH RESPECT TO THE ABS

BACKGROUND

FIG. 1 depicts a side view of a conventional, recently introduced magnetic recording head 1 used in recording to and reading from a media (not shown). The conventional magnetic recording head 1 may be a perpendicular magnetic recording (PMR) head or a longitudinal magnetic recording head. The conventional head 1 includes a conventional read transducer 2 and a conventional write transducer 10. The conventional read transducer 2 includes shields 4 and 8 and read sensor 6. The conventional write transducer 10 includes a conventional first pole (P1) 12, a first coil 14, a conventional main pole 18, conventional write gap 20 near the air-bearing surface (ABS), a conventional second coil 22, and shield 24. The conventional main pole 18 includes a conventional base portion 17 and a conventional beveled portion 19. The conventional main pole 18 is typically fabricated by forming a larger pole structure having a thickness including equal to that of the conventional base portion 17 and the conventional beveled portion 19 taken together. A portion of this structure in proximity to the ABS is removed, thinning the structure near the ABS. As a result, the conventional base portion 17 and the conventional beveled portion 19 are fabricated. Alternatively, the conventional beveled portion 19 may be formed first, then the base portion 17 added later. In such a case, the beveled portion 19 may reside below the main portion 17. The conventional shields 4, 8, and 24 are also typically formed of such magnetic materials.

Although the conventional magnetic recording head 1 functions, use at higher densities may be limited. At higher recording density, the thickness of the main pole 18 near the ABS is desired to be thinner. At the same time, the flux density used in writing is desired to be maintained. The conventional beveled portion 19 may be used to increase the flux near the write gap 20 without increasing the thickness of the base portion 17. However, the main pole 18 may be difficult to fabricate for higher density recording. In particular, the combination of the conventional base portion 17 and the conventional beveled portion 19 may be difficult to adequately fabricate together at low track widths. As a result, the conventional magnetic transducer 1 may exhibit poor writeability at higher recording densities.

Accordingly, what is needed is a system and method for improving the performance of a magnetic recording head at higher recording densities.

BRIEF SUMMARY OF THE INVENTION

A method and system for providing a magnetic transducer that includes an underlayer are described. The method and system include providing a recessed region in the underlayer. The recessed region includes a front having an angle from horizontal. The angle is greater than zero and less than ninety degrees. The method and system further includes providing an assist pole layer in the recessed region and providing a main pole layer. A portion of the main pole layer resides on the assist pole layer. A main pole is defined from the assist pole layer and the main pole layer.

DETAILED DESCRIPTION OF THE PREFERRED EMBODIMENTS

Figure 1:
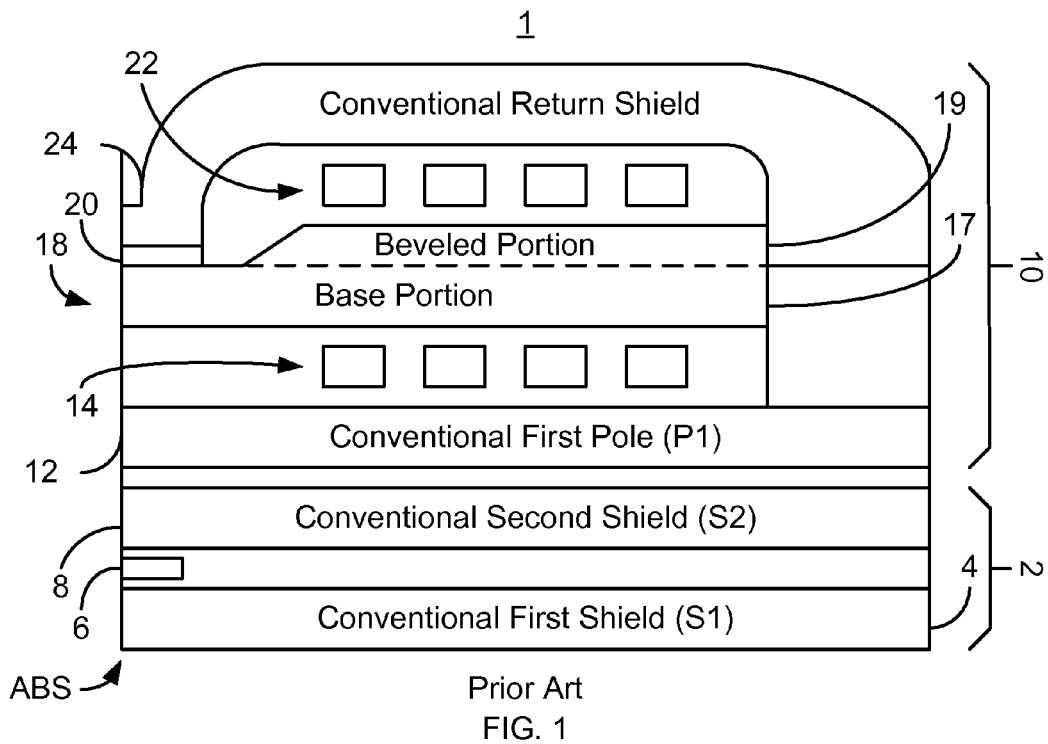
FIG. 1 is a side view of a conventional magnetic recording head.
Figure 2:
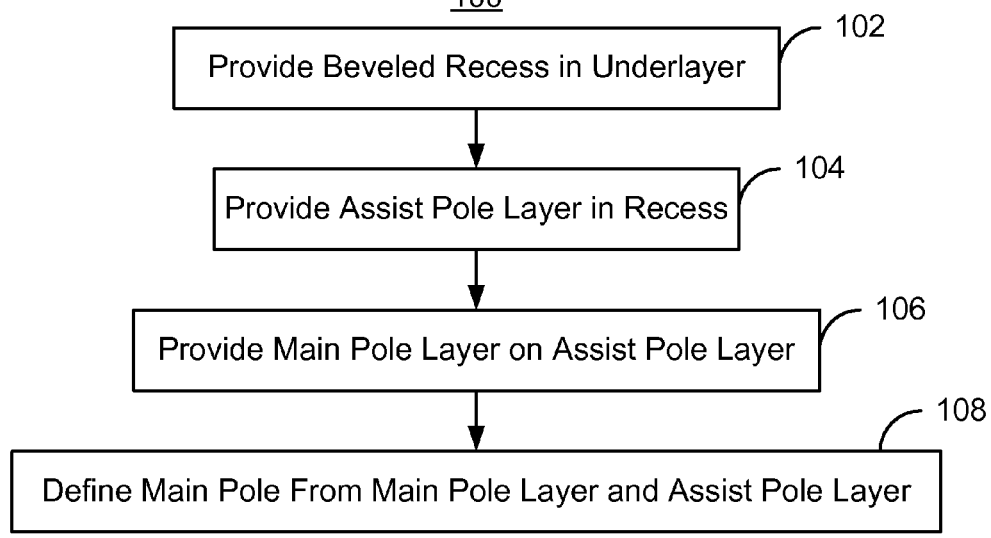
FIG. 2 is a flow chart depicting an exemplary embodiment of a method for fabricating a magnetic recording transducer.

FIG. 2 is a side view of an exemplary embodiment of a method 100 for providing magnetic recording transducer. For simplicity, some steps may be omitted. The method 100 is also described in the context of providing a single recording transducer. However, the method 100 may be used to fabricate multiple transducers at substantially the same time. The method 100 is also described in the context of particular layers. A particular layer may include multiple materials and/or multiple sublayers. The method 100 also may start after formation of other portions of the magnetic recording transducer. For example, the method 100 commences after formation of an underlayer in the magnetic recording transducer. The underlayer is nonmagnetic. In one embodiment, the underlayer is an insulator, such as aluminum oxide.

A recessed region is provided in the underlayer, via step 102. The recessed region has a front that is closer to the ABS and is angled down from horizontal. This angle from horizontal is greater than zero and less than ninety degrees. In one embodiment, the angle is at least fifteen degrees and not more than seventy-five degrees. In one such embodiment, the angle is at least forty degrees and not more than fifty degrees. Thus, the recess is beveled at least at its front. In one embodiment, step 102 is performed by masking a portion of the underlayer and performing an ion mill at a milling angle. The milling angle may be targeted to be substantially the same as the angle formed in the recess. The recess formed may be at the ABS or may be slightly removed from the ABS. In one embodiment, the front of the recess is no more than one hundred nanometers from the ABS. In one such embodiment, the recess may be substantially at the ABS.

An assist pole layer is provided in the recessed region, via step 104. In one embodiment, step 104 includes depositing a layer of high saturation magnetization material(s) while the mask used in forming the recess is still in place. In one embodiment, step 104 sputters the assist pole layer at an angle. Materials that may be used for the assist pole layer might include soft magnetic alloys such as NiFe, CoNiFe, CoFe, and CoFeN. In addition, seed layer(s) may also be deposited in step 104 prior to deposition of the magnetic material(s). Because the assist pole layer is deposited in the recess, the bottom surface of the assist pole layer substantially follows the contour of the recess. Thus, the bottom of the assist pole layer includes a bevel. In one embodiment, the top surface of the assist pole layer forms an angle above horizontal. In one embodiment, the angle is at least fifteen and not more than forty-five degrees. In one such embodiment, the angle is at least twenty-five and not more than thirty-five degrees. As a result, the top of the assist pole layer may also be considered to be beveled at least at the front.

A main pole layer is provided, via step 106. At least a portion of the main pole layer resides on the assist pole layer. Step 106 includes depositing a layer of a high saturation magnetization material. Materials that may be used for the main pole layer might include soft magnetic alloys such as NiFe, CoNiFe, CoFe, and CoFeN. In one embodiment, the same materials are used for both the assist pole layer and the main pole layer. In an embodiment in which the assist pole layer is recessed from the ABS, at least a portion of the main pole layer near the ABS does not reside on the assist pole layer. Instead, this portion is located in front of the assist pole layer. The contour of the main pole layer substantially follows the contour of the assist pole layer. The top surface of the main pole layer may thus make an angle with horizontal that is similar to that of the top surface of the assist pole layer. However, this angle may be located closer to the ABS than the angle is for the assist pole layer. In addition, the angle may not be the same as the angle formed by the bottom of the assist pole layer. In either case, the top of the main pole layer is beveled at least at the front.

The main pole is defined from both the assist pole layer and the main pole layer, via step 108. Thus, the main pole may include a main pole portion and an assist pole portion. Step 108 may include, for example, providing a mask for the main pole on the main pole layer. In one embodiment, the mask is a hard mask. However, another type of mask might also be used. Step 108 may also include milling the main pole layer and the assist pole layer with the mask in place. Thus, the main pole is formed from the assist and main pole layers. In one embodiment, step 108 may be performed after other structures, such as a write gap, have been formed. Fabrication of the magnetic transducer may be completed. For example, shields, spacers, and/or other structures may be provided.

Using the method 100, a magnetic transducer may be formed. The main pole formed includes an assist pole portion and a main pole portion. Because the bottom of the assist pole layer is formed in the recess, the assist pole portion includes a bottom bevel. The assist pole layer has a top surface that makes an angle with horizontal. The main pole layer substantially follows the contour of the top of the assist pole layer. The main pole portion thus has a top bevel. The main pole, therefore, has a top bevel and a bottom bevel. The bevels may allow sufficient flux to be developed by the magnetic transducer while retaining a thinner pole at the ABS. Further, using the method 100, the assist and main pole portions are also aligned in the track width direction. This alignment is achieved because the main pole is defined from both the assist pole layer and the main pole layer in step 108. Because the assist and main pole portions are self-aligned, fabrication of the main pole at lower track widths may be facilitated. Thus, the track width of the magnetic transducer formed using the method 100 may be reduced. As a result, the method 100 may provide a magnetic transducer that is usable at higher densities.

Figure 3:
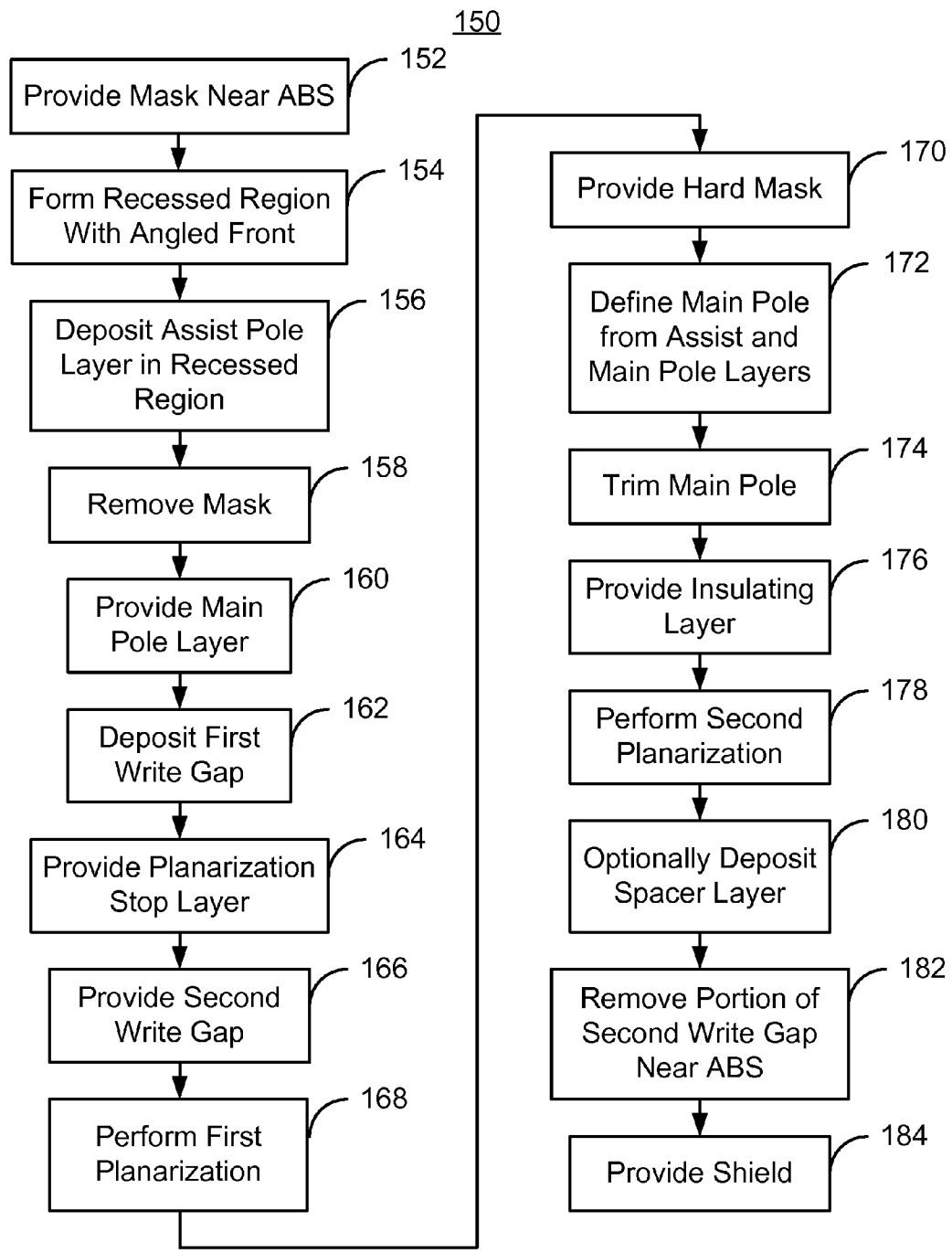
FIG. 3 is a flow chart depicting another exemplary embodiment of a method for fabricating a magnetic recording transducer.

FIG. 3 is a flow chart depicting another exemplary embodiment of a method 150 for fabricating a magnetic recording transducer. For simplicity, some steps may be omitted. FIGS. 4-15 depict an exemplary embodiment of a magnetic recording transducer 200 during fabrication. For clarity, FIGS. 4-15 are not drawn to scale. The transducer 200 may be part of a merged head that includes a read transducer and resides on a slider (not shown). The method 150 is described in the context of the magnetic recording transducer 200. The method 150 is described in the context of providing a single recording transducer 200. However, the method 150 may be used to fabricate multiple transducers at substantially the same time. The method 150 also may commence after formation of other portions of the magnetic recording transducer 200. The method 150 commences after formation of an underlayer in the magnetic recording transducer 200. The underlayer is nonmagnetic. In one embodiment, the underlayer is an insulator, such as aluminum oxide. The method 150 and transducer 200 are also described in the context of particular layers. However, particular layers might include multiple materials and/or one or more sub-layer(s).

Figure 4:
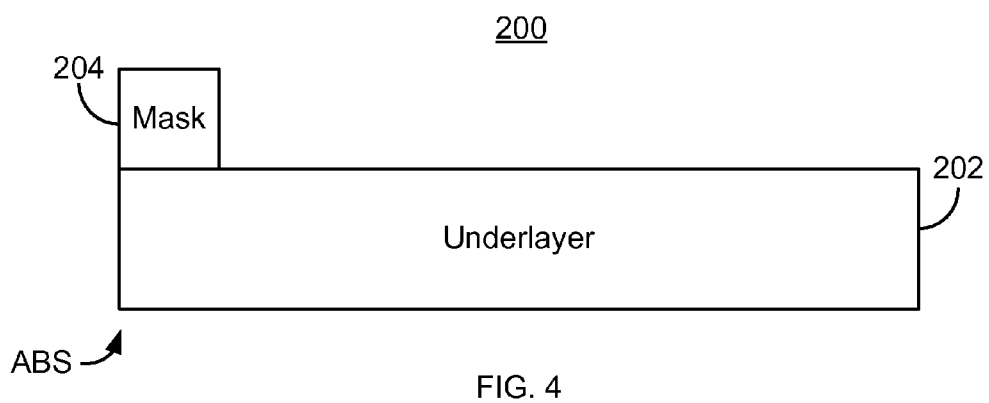
FIGS. 4-15 depict an exemplary embodiment of a magnetic recording transducer during fabrication.

A mask is provided on the underlayer, via step 152. FIG. 4 depicts the magnetic recording transducer 200 after step 152 is performed. Thus, an underlayer 202 having a mask 204 thereon is shown. In one embodiment, the mask 204 is a photoresist mask and resides at or near the region of the device 200 that will become the ABS.

Figure 5:
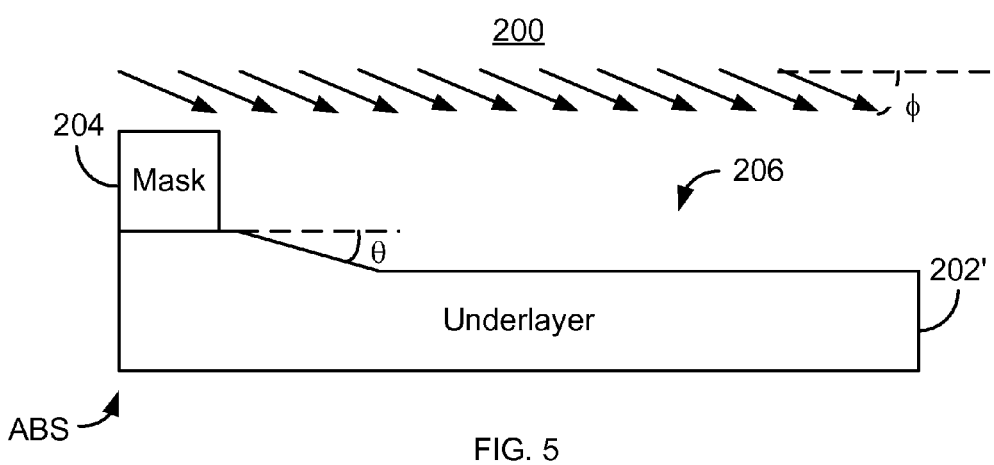

The underlayer 202 is ion milled with the mask 204 in place to provide a recessed region in the underlayer, via step 154. FIG. 5 depicts the magnetic recording transducer 200 during step 154. Step 154 may be performed by ion milling the magnetic recording transducer 200 at an angle, $\phi$. The recess 206 is formed in the underlayer 202'. The recess 206 has a front angle, $\theta$, below horizontal. The angle, $\theta$, is at least fifteen and less than seventy-five degrees. In one such embodiment, the angle, $\theta$, is at least forty degrees and not more than fifty degrees. For example, the angle may be targeted to be approximately forty-five degrees. In order to form the recess having the desired angle, $\theta$, the milling angle, $\phi$, may be set to be the targeted angle, $\theta$. In the embodiment shown, the recess 206 is removed from the ABS. However, in another embodiment, the front of the recess 206 may be closer to or even at the ABS. For example, the recess 206 may be terminated one hundred nanometers or less from the ABS.

Figure 6:
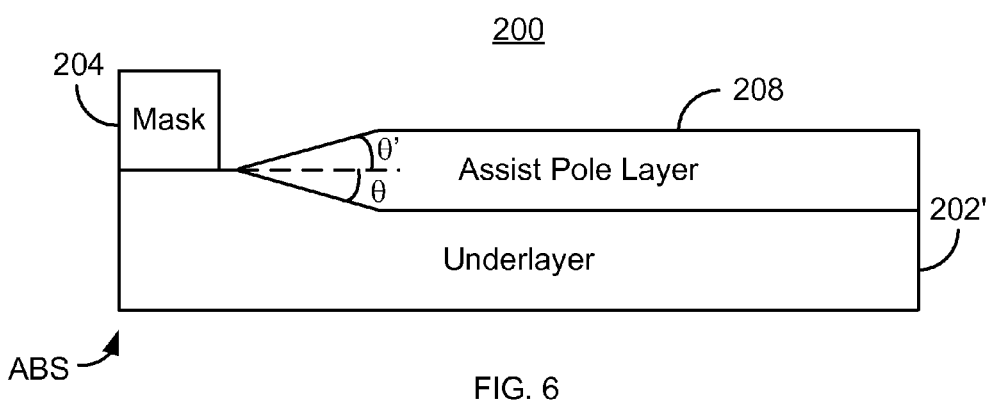

An assist pole layer is deposited in the recessed region 206, via step 156. In one embodiment, step 156 is performed by blanket sputtering the material(s) for the assist pole layer at an angle. In one embodiment, step 156 also includes providing a seed layer on the underlayer. FIG. 6 depicts the magnetic recording transducer 200 after step 156 is performed. Thus, the assist pole layer 208 has been formed. For simplicity, the recess 206 is no longer specifically identified. The assist pole layer 208 terminates substantially at the edge of the recess 206. Because it is sputtered at an angle, the assist pole layer 208 not only follows the contour of the underlayer 202', but also has a top surface that is at an angle, $\theta'$, above horizontal. Thus, the top and bottom surfaces of the assist pole layer 208 are beveled. In the embodiment shown, $\theta$ and $\theta'$ are the same and the top and bottom bevels may terminate at the same distance from the ABS. However, in another embodiment, the angles $\theta$ and $\theta'$ may be different and/or the top and bottom bevels may terminate different distances from the ABS.

Figure 7:
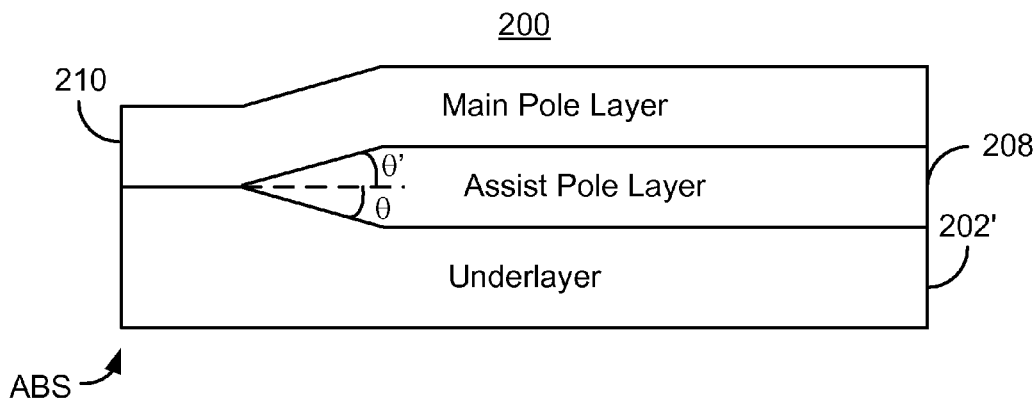

The mask 204 is removed from the magnetic recording transducer 200, via step 158. For example, the mask 204 might be lifted off. A soft planarization, such as a chemical mechanical planarization (CMP) may also be performed. In addition, a main pole layer is provided on the magnetic recording device, via step 160. FIG. 7 depicts the magnetic recording transducer 200 after step 160 is performed. Thus, a main pole layer 210 is present. In one embodiment, the main pole layer 210 is blanket sputtered in step 160. A portion of the main pole layer 210 resides on the assist pole layer 208. In an embodiment in which the assist pole 208 and recess 206 terminate at the ABS, all of the main pole layer 210 may reside on the assist pole layer 208. However, in the embodiment shown, part of the main pole layer 210 resides in front of the assist pole layer 208.

Figure 8:
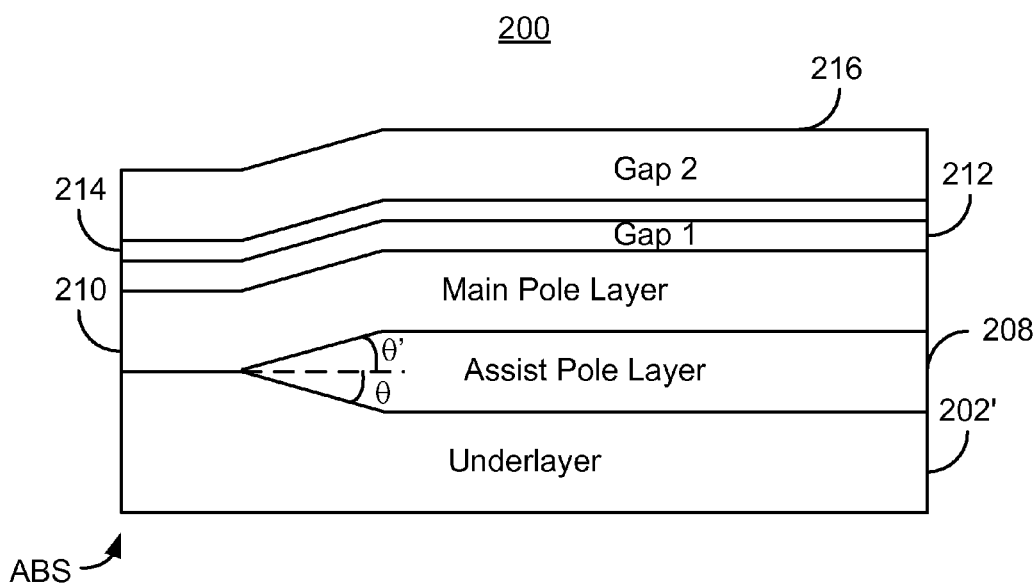

A first a write gap layer is deposited on the at least the portion of the main pole layer 210 near the ABS, via step 162. A planarization stop layer is provided on the first write gap layer, via step 164. A second write gap layer is provided on the planarization stop layer, via step 166. In one embodiment, the second write gap layer may include materials such as aluminum oxide or silicon carbide. The materials for the write gap are thus provided in steps 162, 164, and 166. FIG. 8 depicts the magnetic recording transducer 200 after step 166 is performed. Thus, the first write gap 212, planarization stop layer 214, and second write gap 216 are shown. The planarization stop layer 214 is a stop layer for a planarization step, such as a CMP. Thus, the removal rate of the planarization stop layer 214 is significantly less than at least the removal rate of the second gap 216 during a planarization.

Figure 9:
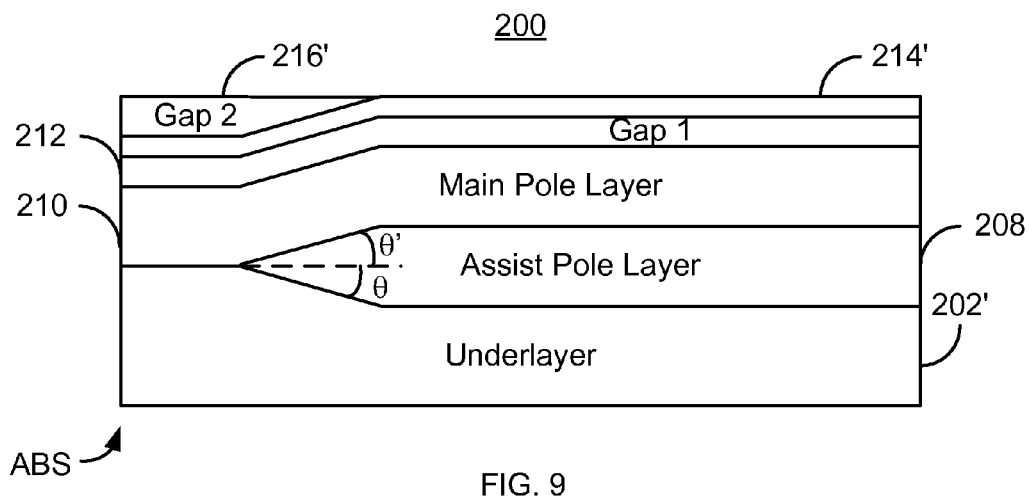

A first planarization is performed, via step 168. In one embodiment, the first planarization is a chemical mechanical planarization (CMP). The CMP is terminated before the planarization stop layer 214 is completely removed. FIG. 9 depicts the magnetic transducer 200 after step 168 is performed. Much of the second gap 216' has been removed. In addition, at least some of the planarization stop layer 214' is generally removed. As a result, the top surface of the magnetic transducer 200 is substantially flat. Thus, the topology of the main pole layer 210 and assist pole layer 208, particularly the top and bottom bevels, is not reflected in the top surface of the magnetic recording transducer 200.

Figure 10:
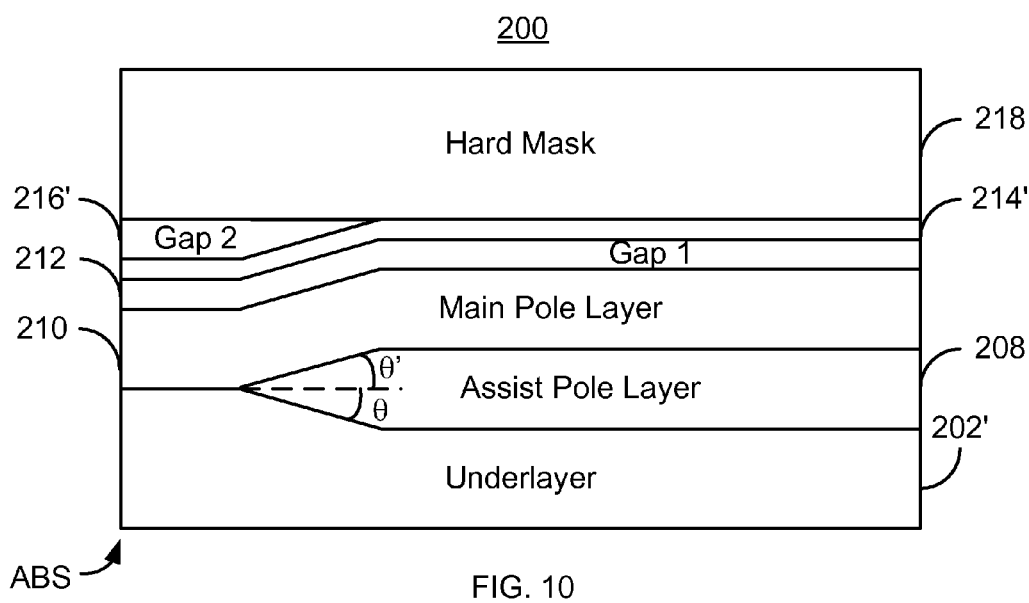
Figure 11:
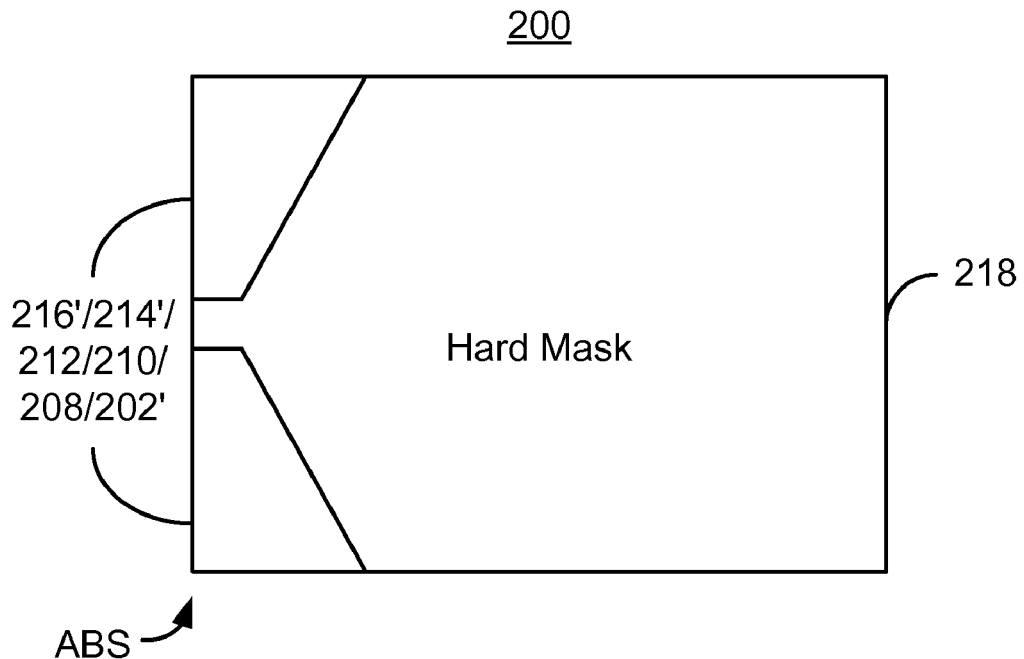

A hard mask is provided, via step 170. Step 170 may include deposition of a hard mask layer, such as NiCr, NiFe, or aluminum oxide, and formation of a photoresist mask. The pattern of the photoresist mask would then be transferred to the hard mask layer to form the hard mask. FIGS. 10 and 11 depict side and plan views, respectively, of the magnetic recording transducer 200 after step 170 has been performed. Thus, a hard mask 218 has been provided. The hard mask 218 defines the edges of the main pole layer 210 and assist pole layer 208 in the track width direction.

Figure 12:
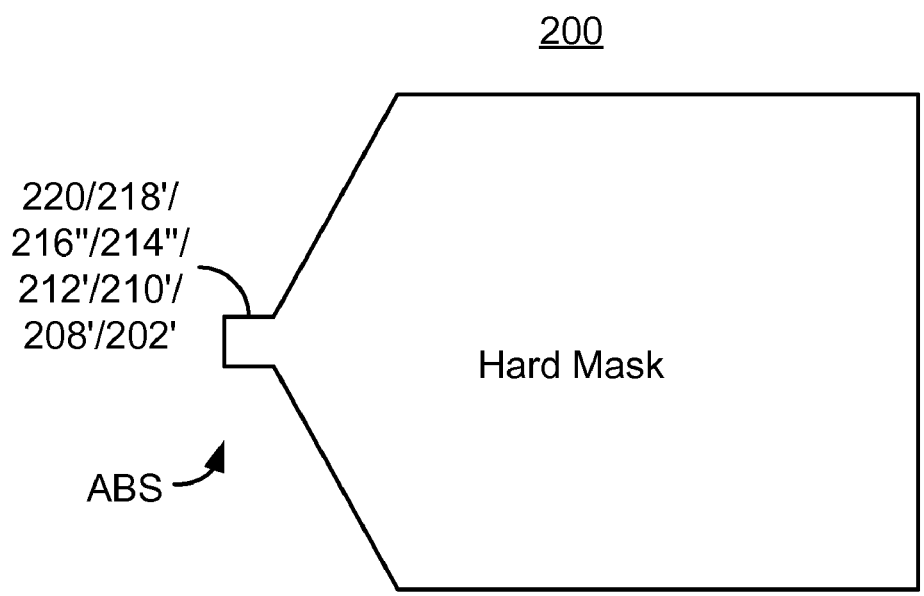

A main pole is defined from the assist pole layer 208 and the main pole layer 210, via step 172. Step 172 may be performed by milling the main pole layer 210 and assist pole layer 208 with the hard mask 218 in place. FIG. 12 depicts a plan view of the magnetic recording transducer 200 after step 172 is performed. Portions of the assist pole layer 208 and main pole layer 210 exposed by the hard mask 218 have been removed. Thus, main pole 220 has been formed from the main pole layer 210' and the assist pole layer 208'. Thus, the main pole 220 includes a main pole portion 210' and an assist pole portion 208'. As part of step 172, exposed portions of the first write gap layer 212', planarization stop layer 214'', and second write gap layer 216'' are also removed. In one embodiment, an additional trim of the main pole may also be performed, via step 174.

Figure 13:
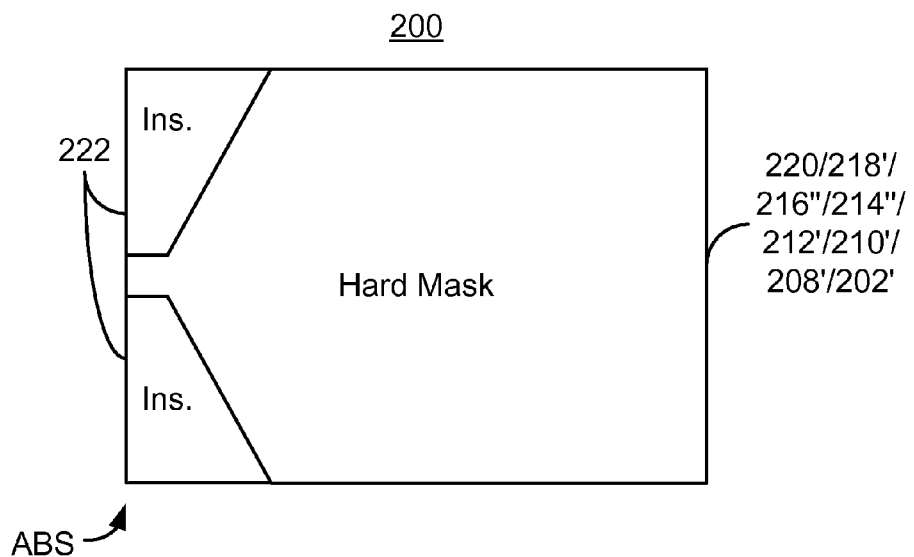

An insulating layer, such as aluminum oxide, is deposited to refill the milled regions, via step 176. In addition, a second planarization is performed, via step 178. The second planarization may be a second CMP. FIG. 13 depicts a plan view of the magnetic recording transducer 200 after step 178 is performed. Thus, the insulator 222 has been provided.

Figure 14:
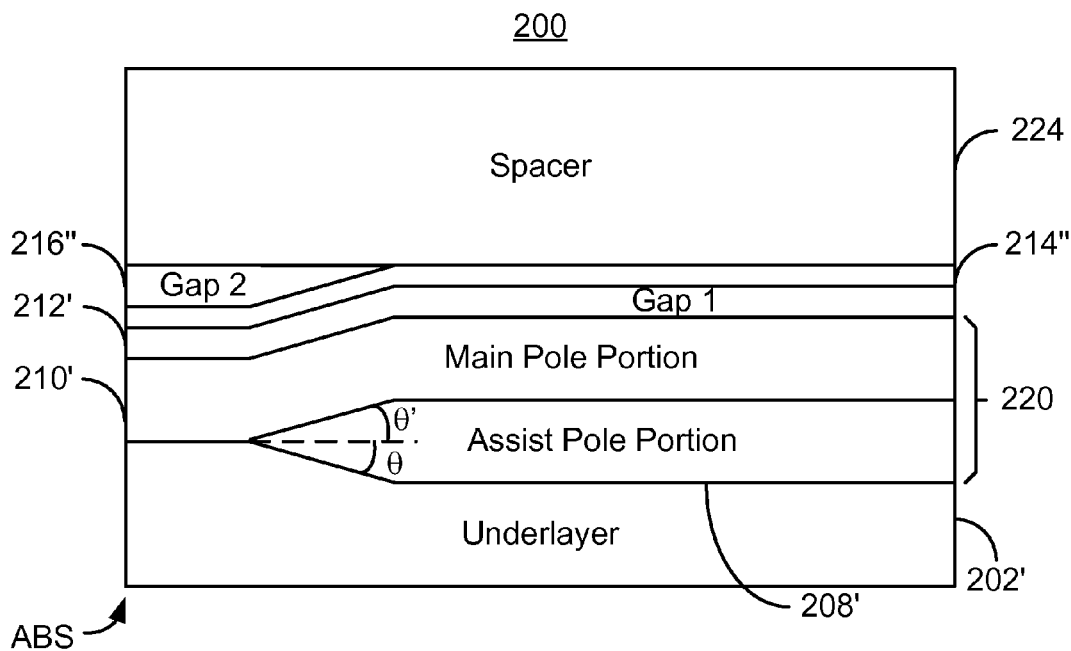

The write gap is to be completed and the shield formed. In one embodiment, a spacer is optionally deposited, via step 180. FIG. 14 depicts a side view of the magnetic recording transducer 200 after step 180 is performed. An additional planarization which may remove a portion of the gap 216'' and planarization stop layer 214'' may also be performed in step 178. In addition, the spacer 224 has been deposited.

A portion of the second write gap layer 216' on the planarization stop layer in a first region near the ABS is removed, via step 182. If the spacer was deposited in step 180, then a portion of the spacer 224 is removed. Step 182 may be performed by masking a portion of the spacer 224 distal from the ABS and removing the exposed portion of the spacer 224 and the second write gap layer 216''. In another embodiment, the portion of second write gap layer 216'' is removed.

Figure 15:
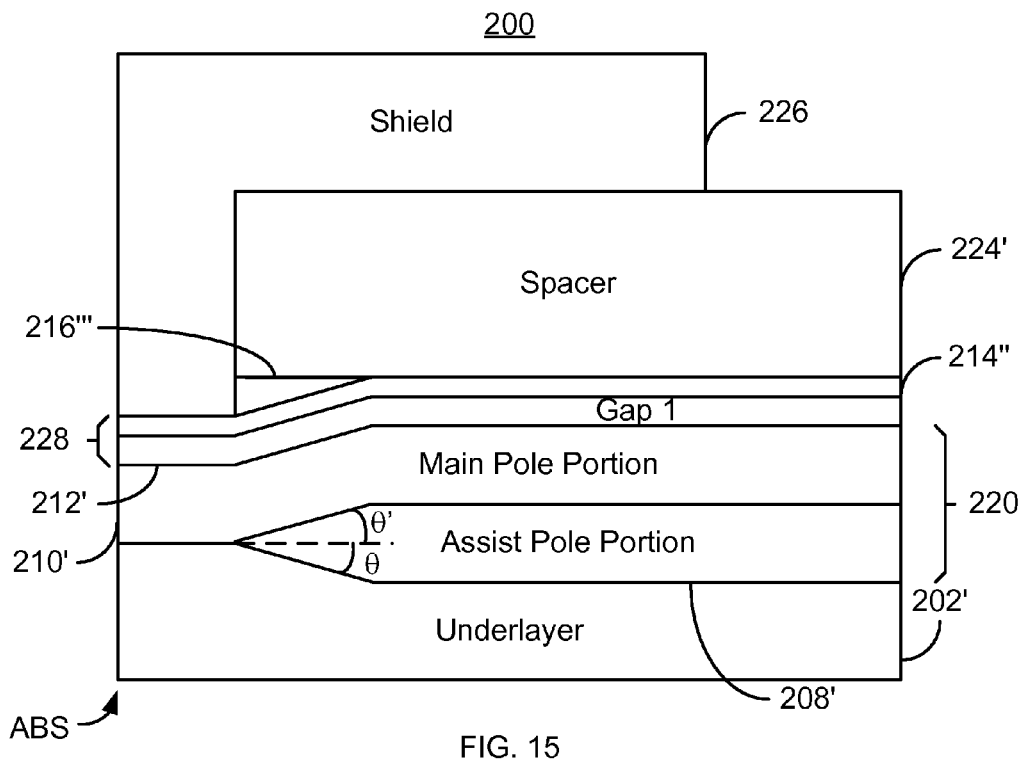

At least a portion of a shield is provided in this region near the ABS, via step 184. Step 184 includes depositing soft magnetic material(s). FIG. 15 depicts the magnetic transducer 200 after step 184 is completed. In the embodiment shown in FIG. 15, the spacer 224 was provided in step 180. The spacer 224' shown in FIG. 15 remains after steps 182 and 184. In addition, only a portion of the second write gap layer 216''' remains. Thus, a write gap 228 has been formed. The shield 226 resides on the write gap 228. In addition, in the embodiment shown, the bevels are recessed from the ABS. However, in another embodiment, the bevels may be closer to, including at, the ABS.

Figure 16:
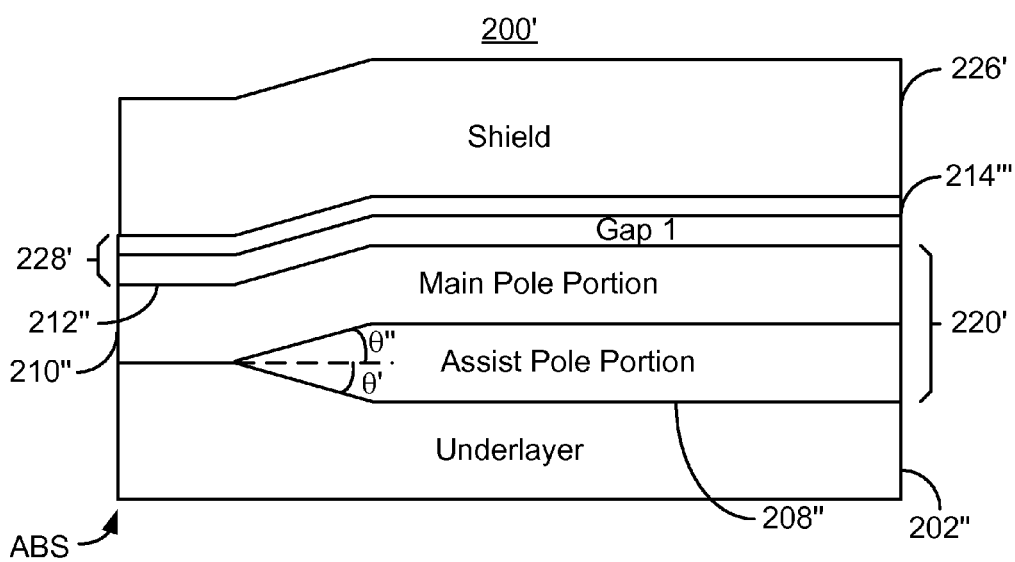
FIG. 16 depicts another exemplary embodiment of a magnetic recording transducer.

FIG. 16 depicts of another exemplary embodiment of a magnetic recording transducer 200'. Components of the magnetic transducer 200' are analogous to the magnetic transducer 200 and are, therefore, labeled similarly. The magnetic transducer 200' thus includes an underlayer 202'', assist pole portion 208'', main pole portion 210'', first gap layer 212'', planarization stop layer 214''', write gap 228', and shield 226'. In addition, in the embodiment shown, the bevels are recessed from the ABS. However, in another embodiment, the bevels may be closer to, including at, the ABS. The magnetic recording transducer 200' may be fabricated if step 180 of the method 150 is omitted. In particular, the spacer layer is not fabricated. Consequently, the shield 226' follows the contour of the planarization layer 214''.

The method 150 shares the benefits of the method 100. Thus, the magnetic transducers 200/200' in which the main pole 220/220' has bevels may be fabricated. The main pole 220/220' includes the assist pole portion 208'/208'' and a main pole portion 210'/210''. Because the bottom of the assist pole layer 208 is formed in the recess 206, the assist pole portion 208'/208'' includes a bottom bevel. Because of the deposition method of the assist pole layer 208 and the main pole layer 210 substantially follows the contour of the top of the assist pole layer 208, the main pole portion 210'/210'' has a top bevel. Thus, the main pole 220/220' has both top and bottom bevels. The bevels may allow sufficient flux to be developed by the magnetic transducer while retaining a thinner pole at the ABS. The assist pole portion 208'/208'' and main pole portion 210'/210'' are also aligned in the track width direction. Because the assist pole portion 208'/208'' and the main pole portion 210'/210'' are self-aligned, the track width of the main pole 220/220' may be reduced. As a result, the transducer 200/200' is usable at higher densities.

Figure 17:
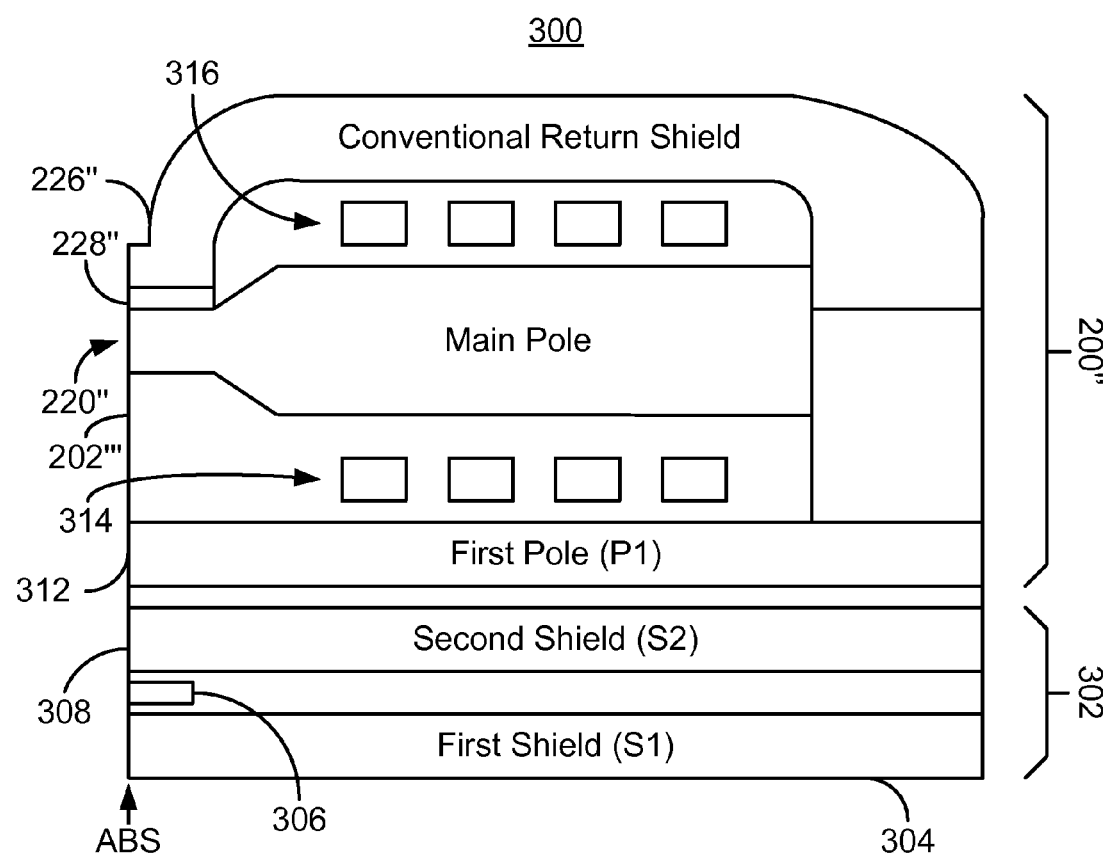
FIG. 17 depicts another exemplary embodiment of a magnetic recording head.

FIG. 17 depicts another exemplary embodiment of a magnetic recording head 300. The magnetic recording head 300 includes a magnetic transducer 200'' as well as a read transducer 302. The magnetic recording head 300 may be a PMR head or a longitudinal magnetic recording head. The read transducer 302 includes shields 304 and 308 and read sensor 306. The 200'' is analogous to the magnetic transducer 200 depicted in FIG. 15 and thus includes similar components. In another embodiment, the transducer 200" could be analogous to the transducer 200' depicted in FIG. 16. Referring back to FIG. 17, the magnetic transducer 200' thus includes coils 314 and 316, main pole 220" write gap 228", and shield 226". For simplicity, the separate portions of the main pole 220" and write gap 228" are not shown. Although the magnetic transducer 200" is depicted with two coils 314 and 316, a single coil may also be used.

The magnetic recording head 300 is configured to be used in a disk drive. As a result, the drive shares the benefits of the magnetic transducers 200 and 200'. In particular, the magnetic recording head 300 may be used at higher densities.

We claim:

1. A magnetic transducer including an underlayer and having a track-width direction, the magnetic transducer comprising:
   an assist pole recessed from an air bearing surface, the assist pole having a bottom angle and a top angle from horizontal, the bottom angle being greater than zero and less than ninety degrees, the top angle being greater than zero and less than ninety degrees, the assist pole consisting of at least one material;
   a main pole layer, a portion of the main pole layer residing on the assist pole and having a bottom substantially conformal with the top angle, the main pole layer having a top bevel having an angle from the horizontal greater than zero and less than ninety degrees, the main pole layer consisting of the at least one material;
   a write gap residing on at least a portion of the main pole; and
   a shield, at least a portion of the shield residing on the write gap;
   wherein the assist pole and the portion of the main pole are aligned in the track-width direction.

2. The magnetic transducer of claim 1 wherein the bottom angle is at least fifteen degrees and not more than seventy-five degrees.

3. The magnetic transducer of claim 2 wherein the bottom angle is at least forty degrees and not more than fifty degrees.

4. The magnetic transducer of claim 1 wherein the angle of the bevel of the main pole is at least fifteen and not more than forty-five degrees.

5. The magnetic transducer of claim 1 wherein the write gap includes a planarization stop layer and the portion of the shield resides on the planarization stop layer.

6. A disk drive including a magnetic head comprising:
   a magnetic transducer, the magnetic transducer having a track-width direction and including
   an underlayer;
   an assist pole recessed from an air bearing surface, the assist pole having a bottom angle and a top angle from horizontal, the bottom angle being greater than zero and less than ninety degrees, the top angle being greater than zero and less than ninety degrees;
   a main pole layer, a portion of the main pole layer residing on the assist pole and having a bottom substantially conformal with the top angle, the main pole layer having a top bevel having an angle from the horizontal greater than zero and less than ninety degrees;
   a write gap residing on at least a portion of the main pole; and
   a shield, at least a portion of the shield residing on the write gap;
   wherein the assist pole and the portion of the main pole are aligned in the track-width direction.

* * * * *